United States Patent
Dyer et al.

(10) Patent No.: US 9,350,111 B1
(45) Date of Patent: May 24, 2016

(54) SYSTEM AND METHOD FOR INTERFACING WITH NETWORK ACCESS DEVICES

(75) Inventors: Ben Dyer, Huntsville, AL (US); Grant Joseph Kruse, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 910 days.

(21) Appl. No.: 13/042,139

(22) Filed: Mar. 7, 2011

(51) Int. Cl.
  *H01R 13/40* (2006.01)
  *H01R 13/44* (2006.01)
  *H01R 13/52* (2006.01)

(52) U.S. Cl.
  CPC ............ *H01R 13/5221* (2013.01); *H01R 13/52* (2013.01); *H01R 13/521* (2013.01); *H01R 13/5202* (2013.01); *H01R 13/5205* (2013.01)

(58) Field of Classification Search
  USPC .......... 174/68.1; 439/587, 135, 142, 281, 282
  See application file for complete search history.

(56) References Cited

U.S. PATENT DOCUMENTS

| | | | |
|---|---|---|---|
| 4,789,759 A | 12/1988 | Jones | |
| 5,229,951 A * | 7/1993 | Sugita et al. | 700/187 |
| 5,389,005 A * | 2/1995 | Kodama | 439/272 |
| 5,472,352 A * | 12/1995 | Nishide et al. | 439/274 |
| 6,056,562 A * | 5/2000 | Kobayashi et al. | 439/125 |
| 6,448,496 B1 | 9/2002 | Daoud | |
| 6,582,248 B2 * | 6/2003 | Bachman | 439/462 |
| 6,817,902 B2 * | 11/2004 | Bernardi et al. | 439/676 |
| 7,004,765 B2 * | 2/2006 | Hsu et al. | 439/79 |
| 7,074,066 B2 * | 7/2006 | Pepe | 439/321 |
| 7,268,299 B2 * | 9/2007 | Allen et al. | 174/92 |
| 7,285,014 B2 | 10/2007 | Castaldo et al. | |
| 7,303,418 B2 * | 12/2007 | O'Connor | 439/277 |
| 7,520,768 B2 | 4/2009 | Nicholson | |
| 2005/0254757 A1 * | 11/2005 | Ferretti et al. | 385/88 |
| 2005/0281510 A1 * | 12/2005 | Vo et al. | 385/60 |
| 2008/0068798 A1 | 3/2008 | Hendrix et al. | |
| 2009/0074369 A1 * | 3/2009 | Bolton et al. | 385/135 |
| 2009/0176416 A1 | 7/2009 | Flynn et al. | |
| 2010/0261367 A1 * | 10/2010 | Billman et al. | 439/271 |

* cited by examiner

*Primary Examiner* — Sherman Ng
(74) *Attorney, Agent, or Firm* — Maynard Cooper & Gale, P.C.; Jon Holland

(57) ABSTRACT

Embodiments of the present disclosure generally pertain to systems and methods for interfacing with a network access device ("NAD"). An NAD in accordance with an exemplary embodiment of the present disclosure comprises an interface extension extending from a housing of the NAD. The interface extension comprises a cable and an enclosure that is sealed by a removable cap. The cable extends from a port on the housing, and the enclosure is positioned on the cable a desired distance from the housing. The removable cap screws onto the enclosure to form a water-tight chamber within the enclosure. The interface extension further comprises an interface connector connected to an end of the cable, and the interface connector is positioned within the chamber when the removable cap is screwed onto the enclosure. When access to the NAD is desired, a technician removes (e.g. unscrews) the removable cap from the enclosure and connects the interface connector to a user interface device. Accordingly, access to the interface of the NAD is facilitated.

13 Claims, 11 Drawing Sheets

SECTION A-A

SYSTEM AND METHOD FOR INTERFACING WITH NETWORK ACCESS DEVICES

RELATED ART

Communication systems often have network access devices ("NADs"), such as, for example, digital subscriber line access multiplexers ("DSLAMs"), positioned at remote locations between a network facility and one or more customer premises. Oftentimes, the NADs are located in areas that are difficult to access and/or prone to flooding, such as, for example, manholes, handholes, or poles. When positioned in such areas, the NAD is typically sealed within a housing to prevent water from damaging components of the NAD.

In order to access the NAD, a technician must travel to the location of the NAD, find the NAD, remove a cap from an interface port, and connect a user interface device to an interface connector of the interface port. However, accessing the NAD is often difficult or problematic, particularly when the NAD is installed in a location such as, for example, a manhole or handhole. In some cases, water must be pumped from the manhole, handhole, or other location to enable access to the NAD. Thus, systems and methods for facilitating access to NADs are generally desirable.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for interfacing with a network access device ("NAD"). An NAD in accordance with an exemplary embodiment of the present disclosure comprises an interface extension extending from a housing of the NAD. The interface extension comprises a cable and an enclosure that is sealed by a removable cap. The cable extends from a port on the housing, and the enclosure is positioned on the cable a desired distance from the housing. The removable cap screws onto the enclosure to form a water-tight chamber within the enclosure. The interface extension further comprises an interface connector connected to an end of the cable, and the interface connector is positioned within the chamber when the removable cap is screwed onto the enclosure. When access to the NAD is desired, a technician removes (e.g. unscrews) the removable cap from the enclosure and connects the interface connector to a user interface device. Accordingly, access to the interface of the NAD is facilitated.

Figure 1:
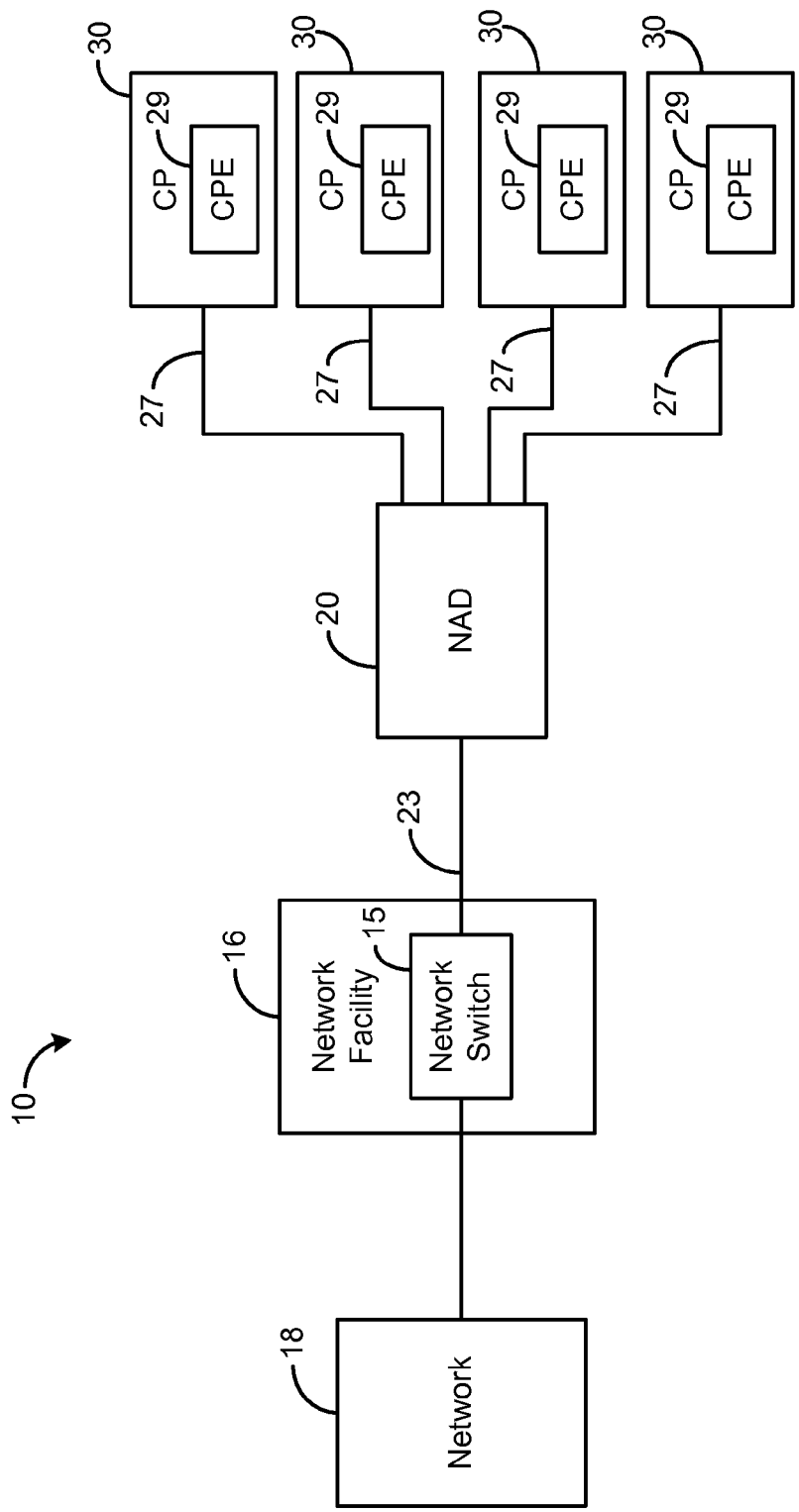
FIG. 1 is a block diagram depicting an exemplary embodiment of a communication system.

FIG. 1 depicts an exemplary embodiment of a communication network 10. As shown by FIG. 1, the communication network 10 comprises a network switch 15 located at a network facility 16, such as a central office. The network switch 15 is connected to a network 18 and communicates with an NAD 20 via a high-speed network connection 23. In one embodiment, the network connection 23 comprises an optical fiber, although other network connections are possible in other embodiments.

In one embodiment, the NAD 20 implements an access multiplexer, such as, for example, a digital subscriber line access multiplexer ("DSLAM"), that receives a high-speed data signal from the network switch 15 and demultiplexes the data signal across a plurality of subscriber lines 27 for transmission to customer premises equipment 29 located at one or more customer premises 30. In such an embodiment, the NAD 20 receives data signals from the customer premises equipment 29 and multiplexes the signals across the high speed network connection 23 for transmission to the switch 15. In other embodiments, the NAD 20 may implement other types of telecommunication access equipment, such as a switch, for example.

In one embodiment, the NAD 20 is located at a remote location between the network facility 16 and the customer premises 30, such as, for example, a manhole, handhole, or pole. When located at such remote location, the NAD 20 is often exposed to water and other elements, as will be discussed in more detail hereafter.

Figure 2:
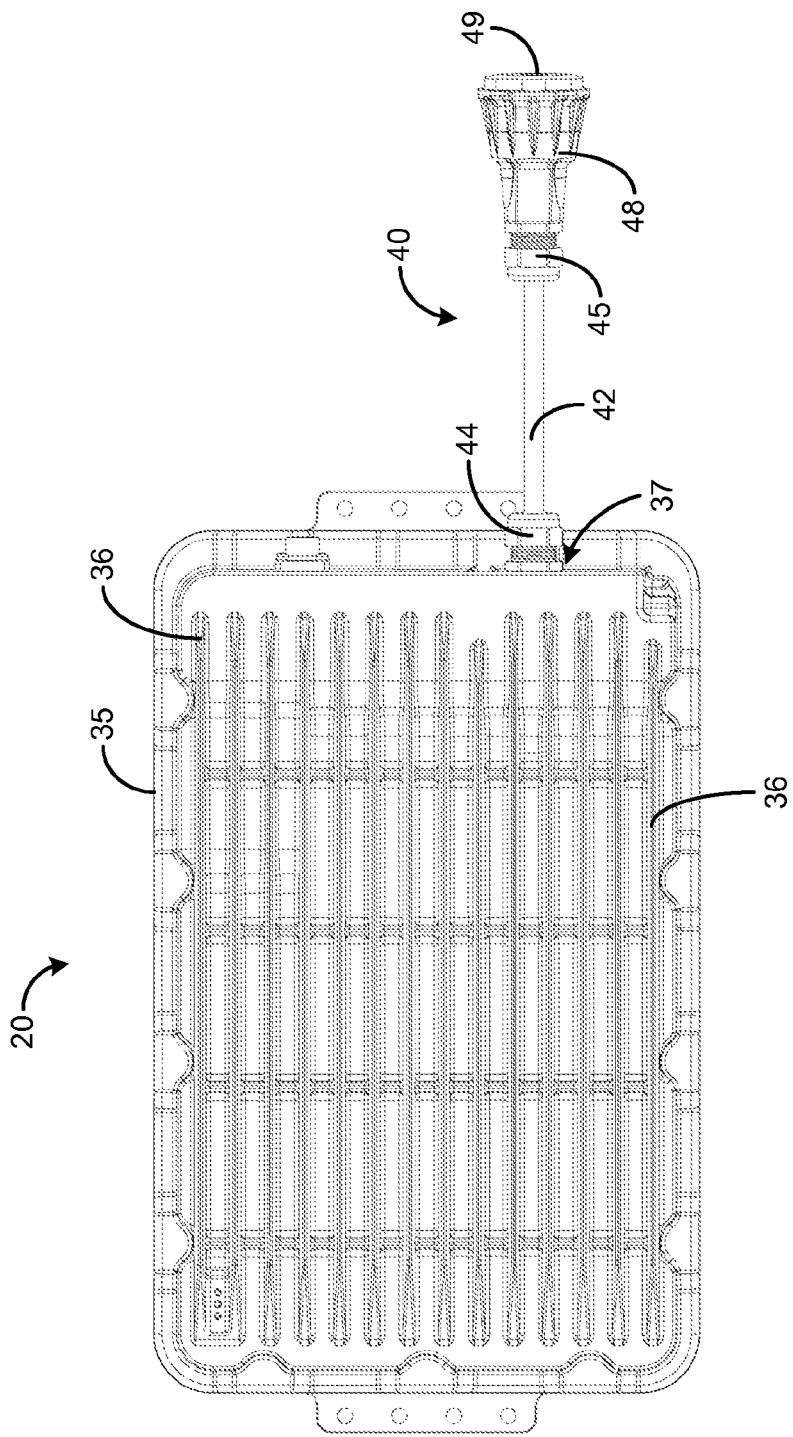
FIG. 2 is a top plan view of an exemplary embodiment of a network access device having an interface extension.

FIG. 2 depicts an exemplary embodiment of an NAD 20. In one embodiment, the NAD 20 communicates via DSL protocols and, hence, implements a DSLAM, although other types of protocols are possible in other embodiments. The NAD 20 comprises an environmentally hardened housing 35 and other components (not shown) positioned within the housing 35. The housing 35 is water-tight and protects the other components of the NAD 20 from harmful environmental factors such as, for example, water and/or mud. The housing 35 is composed of a material conductive to heat, such as, for example, aluminum or other metal thereby helping to sink heat generated by electrical components within the housing 35. The housing 35 has fins 36 that increase the surface area of the housing 35 thereby improving the heat sinking properties of the housing 35.

The NAD 20 further comprises an interface port 37 positioned on a side of the housing 35. The interface port 37 allows a technician to gain management access to the NAD 20 in order to manage the operation of the NAD 20 as may be desired. For example, such management access may include test access, software upgrades, and provisioning the NAD 20 with information such as data rate, modulation format, or other information.

The NAD 20 also comprises an interface extension 40 extending from the interface port 37. As shown by FIG. 2, in one embodiment, the interface extension 40 comprises a cable 42, a plurality of strain relief connectors 44 and 45, and an enclosure 48. A removable cap 49 fits onto the enclosure 48 to form a water-tight chamber (not shown in FIG. 2) within the enclosure 48. In one embodiment, the cap 49 and the enclosure 48 are threaded and an O-ring (not shown in FIG. 2), discussed in more detail hereafter, is positioned between the cap 49 and the enclosure 48 such that a water-tight seal is formed when the cap 49 is screwed onto the enclosure 48. However, different caps forming different types of water-tight seals are possible in other embodiments. The strain relief connector 44 couples to the interface port 37 and forms a water-tight seal around the interface port 37. In one embodiment, the strain relief connector 44 and the interface port 37 are threaded and a grommet (not shown in FIG. 2) composed of a deformable and water-resistant material, such as rubber, is positioned between the connector 44 and the port 37 such that a water-tight seal is formed between the connector 44 and the port 37. However, other connectors forming different types of water-tight seals are possible in other embodiments. Furthermore, the cable 42 extends through a hole (not shown in FIG. 2) of the strain relief connector 44, and the connector 44 forms a water-tight seal around the cable 42 such that no water may enter the NAD 20 through the interface port 37.

The strain relief connector 45 is located a desired distance away from the housing 35, and the strain relief connector 45 couples to the enclosure 48 in order to form a water-tight seal between the connector 45 and the enclosure 48 such that no water may enter the enclosure 48. In one embodiment, the connector 45 and the enclosure 48 are threaded and an O-ring (not shown in FIG. 2) is positioned between the connector 45 and the enclosure 48 such that a water-tight seal is formed between the connector 45 and the enclosure 48 when the enclosure 48 is screwed onto the connector 45. Furthermore, the cable 42 extends through a hole (not shown in FIG. 2) of the connector 45, and a grommet within the connector 45 is positioned around the hole within the connector 45 such that the cable 42 also extends through the grommet. In particular, the grommet forms a hollow ring through which the cable 42 extends. The grommet is composed of a deformable and water-resistant material, such as rubber. When the connector 45 is tightened, the grommet is pressed between the connector 45 and the cable 42 forming a water-tight seal around the cable 42.

In one embodiment, the NAD 20 further comprises an interface connector (not shown in FIG. 2), discussed in more detail hereafter, located on an end of the cable 42 and positioned within the enclosure 48 when the cap 49 is tightened on the enclosure 48. Thus, water may not enter the enclosure 48 and damage the interface connector when the cap 49 is positioned on the enclosure 48. When the cap 49 is removed from the enclosure 48, the interface connector may extend from within the enclosure 48 to facilitate management access by a technician. Furthermore, the cable 42 may be any length such that the interface connector may be positioned at any desired location within close proximity (e.g. several feet) of the NAD 20. In one exemplary embodiment, the interface connector is a serial interface, but other types of interface connectors may be used in other embodiments.

Figure 3:
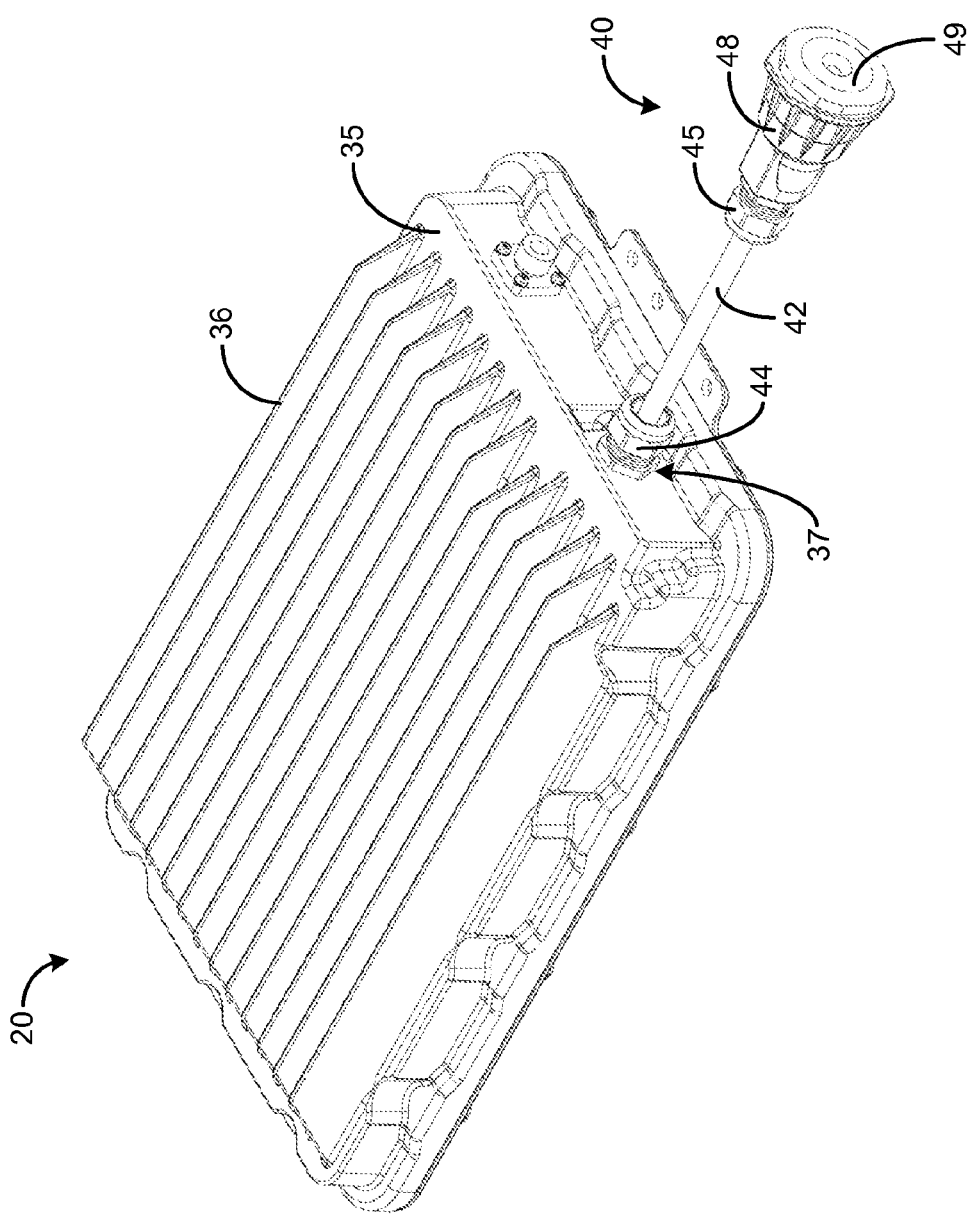
FIG. 3 is a top perspective view of the network access device of FIG. 2.

FIG. 3 depicts a top perspective view of the NAD 20 of FIG. 2. As set forth above, the interface extension 40 extends from the housing 35 in order to facilitate access to the interface port 37. The cable 42 may be any desired length such that the enclosure 48 is positioned a sufficient distance from the housing 35 to allow a technician to conveniently access the interface connector (not shown in FIG. 3) within the enclosure 48 without requiring the technician to locate or access the actual housing 35 and connect his equipment directly to the interface port 37. For example, if the NAD 20 is submerged under water within a manhole or handhole, the enclosure 48 may be positioned near a cover of the manhole or handhole for convenient access by the technician. Thus, the technician may simply remove the cover of the manhole or handhole, quickly find the enclosure 48, and remove the cap 49 from the enclosure 48 in order to access the interface connector rather than pumping the water out of the manhole or handhole and accessing the interface port 37 directly. Also, when the cap 49 is properly positioned on the enclosure 48, no water may enter the enclosure 48 and damage the interface connector. Furthermore, if the technician mistakenly fails to place the cap 49 back onto the enclosure 48 after management access is completed such that water enters the enclosure 48, water will not enter the housing 35 thereby preventing the water from damaging components within the housing 35. If the interface extension 40 is damaged, it may be replaced without requiring the entire NAD 20 to be replaced.

Figure 4:
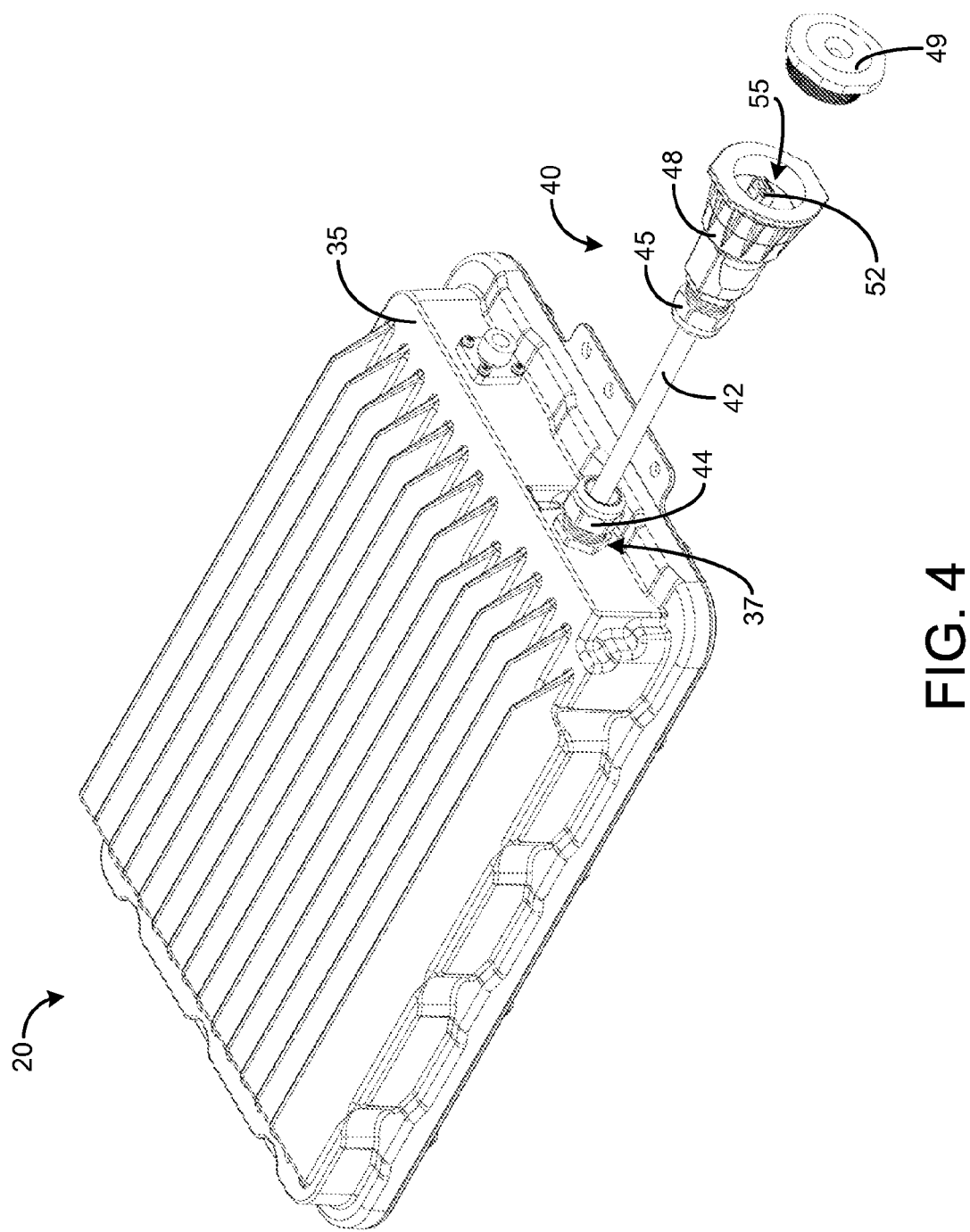
FIG. 4 is a top perspective view of the network access device of FIG. 2 with a removable cap removed from an enclosure.

FIG. 4 depicts the NAD 20 of FIG. 2 with the removable cap 49 removed from the enclosure 48. An interface connector 52, referred to herein as a "craft interface," is located on an end of the cable 42 and is sealed within a chamber 55 of the enclosure 48 when the cap 49 is on the enclosure 48. In one embodiment, the interface connector 52 is a male serial data interface, such as a male RJ-45 interface, but other types of interface connectors are possible in other embodiments.

Figure 5:
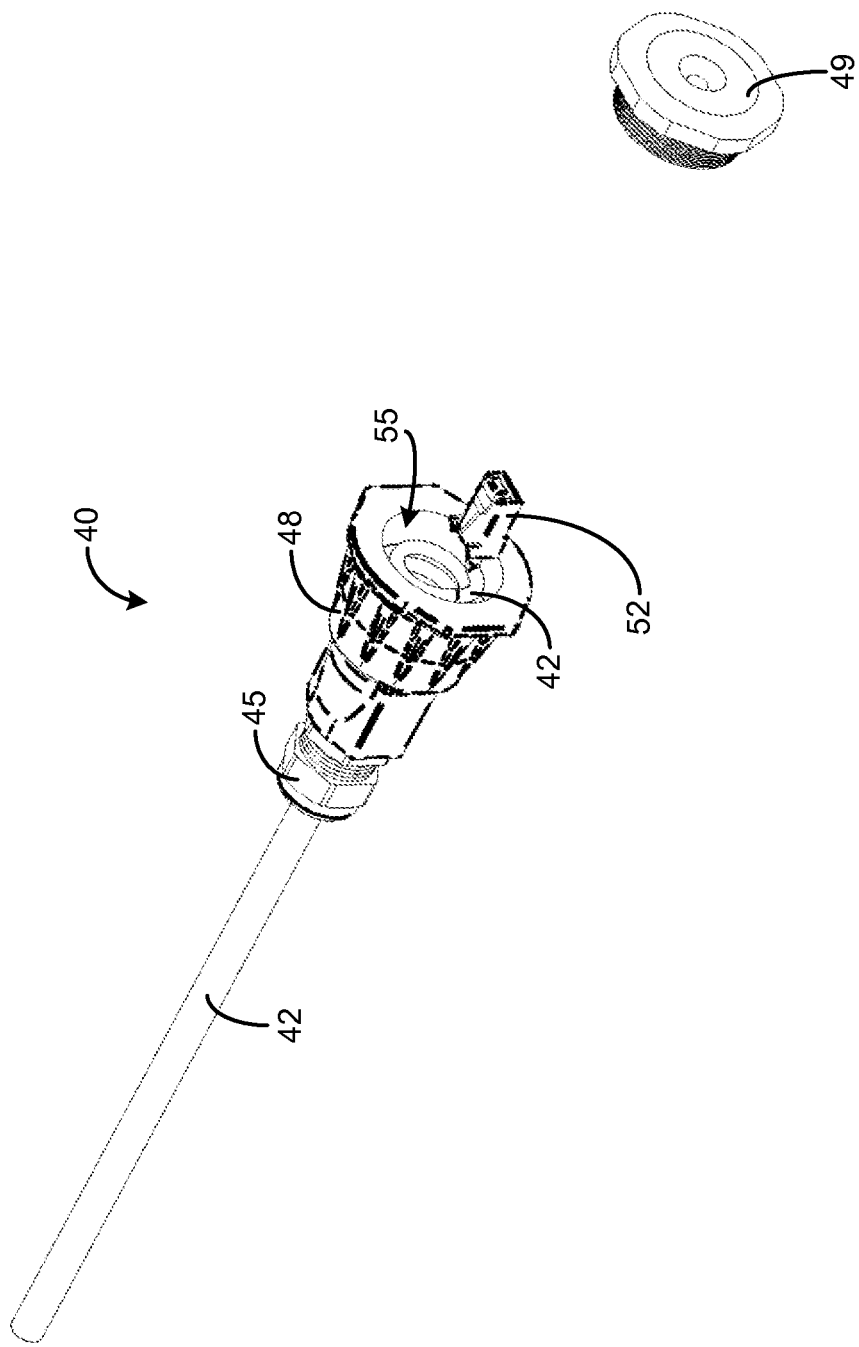
FIG. 5 is a top perspective view depicting a cable coiled within the enclosure of FIG. 4.
Figure 6:
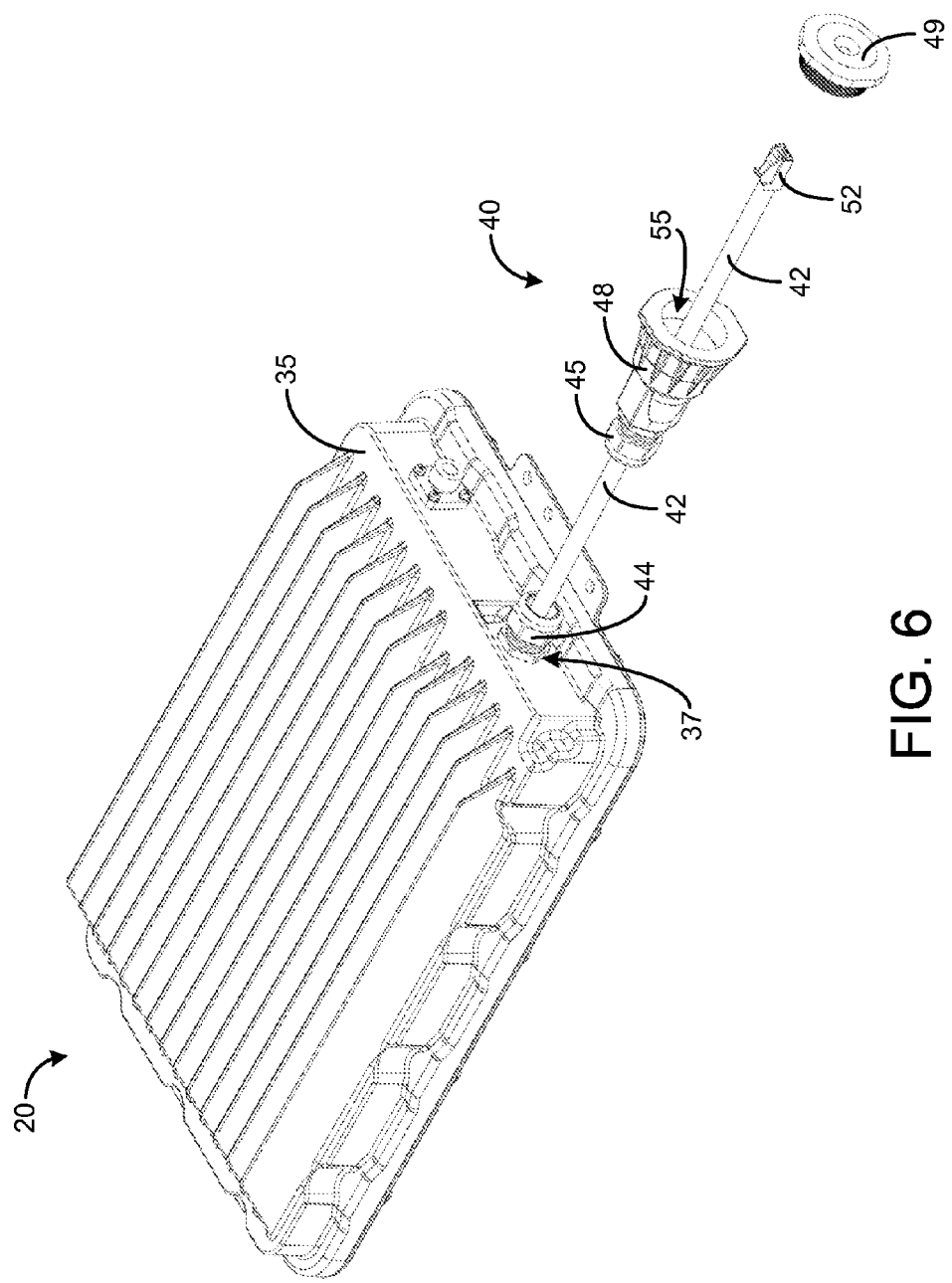
FIG. 6 is a top perspective view of the network access device of FIG. 2 with a male interface connector extending from the enclosure.

When the cap 49 is removed from the enclosure 48, as shown by FIG. 4, the interface connector 52 is exposed thereby allowing a technician to conveniently access the interface connector 52 rather than directly accessing the interface port 37, as is required for typical NADs. As shown by FIG. 5, in one embodiment, a portion of the cable 42 extends into the chamber 55 and is coiled within the chamber 55 to provide enough slack for the interface connector 52 to extend from the chamber 55 when the cap 49 is removed, as shown by FIG. 6. However, in other embodiments, other interface extensions 40 are possible. For example, in one embodiment, a printed circuit board ("PCB") (not shown in FIG. 4) may be positioned within the chamber 55 and the cable 42 may be connected to the PCB such that the cable 42 does not extend completely through the chamber 55. In such embodiment, discussed with respect to FIGS. 7 and 8 below, the technician's equipment may be plugged directly into a female interface connector located on the PCB.

FIG. 6 depicts the NAD 20 of FIG. 2 with the interface connector 52 and a portion of the cable 42 extending from the enclosure 48. After a technician locates the enclosure 48 and removes the cap 49 from the enclosure 48, the interface connector 52 is exposed. In one embodiment, discussed with respect to FIGS. 4 and 5, the interface connector 52 is connected to an end of the cable 42 and a desired length of the cable 42 is coiled within the chamber 55. The technician simply uncoils the cable 42 by pulling the cable 42 such that the interface connector 52 extends from the chamber 55, as shown by FIG. 6, in order to connect the interface connector 52 to his management equipment and gain management access to the NAD 20. For example, the technician may connect the interface connector 52 to a user interface device (e.g. a laptop computer, a personal digital assistant ("PDA"), or any other similar known or future developed device for allowing a user to submit inputs and/or receive outputs) in order to provision the NAD 20.

As set forth above, the cable 42 may be any desired length such that the enclosure 48 may be within a close proximity (e.g. several feet) of the NAD 20 but such that the enclosure 48 is a sufficient distance from the NAD 20 to facilitate convenient access to the interface connector 52 by a technician. Furthermore, the portion of the cable 42 extending into the chamber 55 of the enclosure 48 is preferably a sufficient length to extend out of the chamber and connect to the technician's management equipment, yet is short enough such that the portion of the cable 42 and the interface connector 52 fit within the chamber 55 and allow the cap 49 to fit on the enclosure 48. In one embodiment, the portion of the cable 42 extending into the chamber 55 may be adjusted.

Once the technician finishes managing the NAD 20, the cable 42 is coiled within the chamber 55 and the cap 49 is placed back onto the enclosure 48, as shown by FIGS. 2 and 3, such that water may not enter the chamber 55. Accordingly, the interface extension 40 facilitates access to the interface port 37 of the NAD 20.

Figure 7:
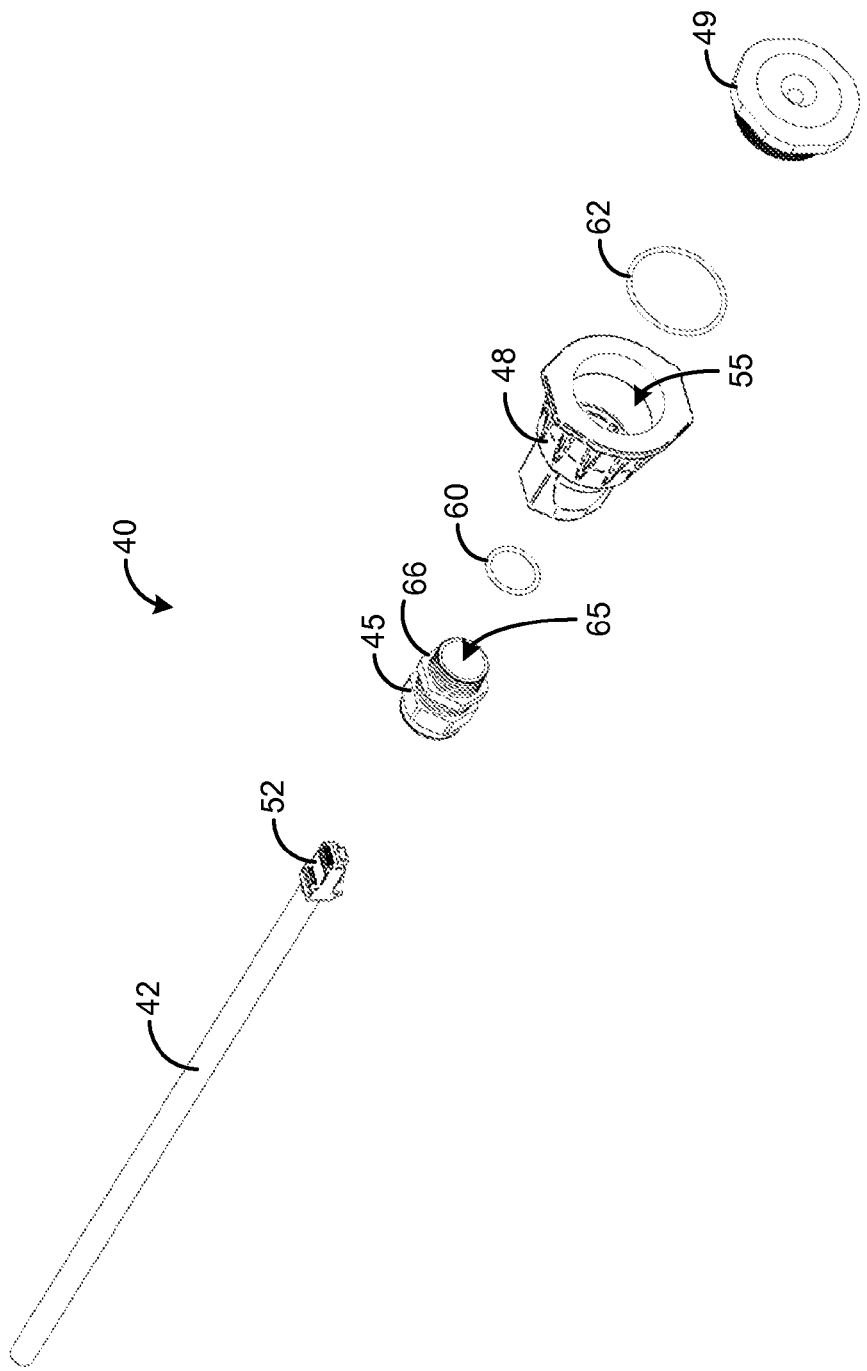
FIG. 7 is an exploded view of an interface extension, such as is depicted by FIG. 2.

FIG. 7 depicts an exploded view of the exemplary interface extension 40 of FIG. 2. As shown by FIG. 7, in one embodiment, the interface extension 40 comprises the cable 42, the male interface connector 52 positioned on an end of the cable 42, the strain relief connector 45, the enclosure 48, the removable cap 49, and a plurality of O-rings 60 and 62. The strain relief connector 45 has a hole 65 for receiving the interface connector 52 and the cable 42 whereby the interface connector 52 and a portion of the cable 42 may pass through the hole 65 of the connector 45 to the chamber 55 of the enclosure 48. As described above, the strain relief connector 45 has a grommet through which the cable 42 extends. Once the cable 42 has passed a desired distance through the strain relief connector 45, the connector 45 is tightened by rotating the end of the connector 45 opposite of the enclosure 48 thereby pressing the grommet against the cable 42 forming a water-tight seal between the connector 45 and the cable 42. The seals formed by the grommet and the O-ring 60 prevent water from entering the chamber 55 through the interface of the connector 45 and the enclosure 48. In other embodiments, other devices and techniques for interfacing the connector 45 and the enclosure 48 and for forming a water-tight seal between the connector 45 and the enclosure 48 are possible.

The interface connector 52 and a portion of the cable 42 extend into the chamber 55 of the enclosure 48. In one embodiment, the inner circumference of an end of the enclosure 48 is threaded and the outer circumference of an end of the strain relief connector 45 is threaded such that the enclosure 48 may be screwed onto the connector 45. The O-ring 60 is positioned around the threaded end of the connector 45 such that the O-ring 60 forms a water-tight seal between the connector 45 and the enclosure 48 when the enclosure 48 is screwed onto the connector 45. That is, the O-ring 60 fits around the threads of the connector 45 and is pressed between a hexagonal stop 66 of the connector 45 and the enclosure 48. The portion of the cable 42 extending into the chamber 55 may be wound into a coil in order for the cable 42 and the interface connector 52 to fit within the chamber 55.

Once the interface connector 52 and the portion of the cable 42 are properly positioned within the chamber 55, the O-ring 62 is positioned around the threaded portion of the cap 49. The inner circumference of the chamber 55 and a portion of the cap 49 are threaded such that the cap 49 may be screwed into the enclosure 48. As the cap 49 is screwed into the enclosure 48, the O-ring 62 forms a water-tight seal between the cap 49 and the enclosure 48 such that no water may enter the chamber 55 between the cap 49 and the enclosure 48. In other embodiments, other devices and techniques for inter-facing the enclosure 48 and the cap 49 and for forming a water tight seal between the enclosure 48 and the cap 49 are possible.

Once the strain relief connector 45 is secured around the cable 42, the enclosure 48 is secured on the connector 45, and the cap 49 is secured on the enclosure 48, the chamber 55 is water-tight such that no water may enter the chamber 55. Accordingly, the interface extension 40 provides protection for the interface connector 52 while facilitating management access to the NAD 20.

Figure 8:
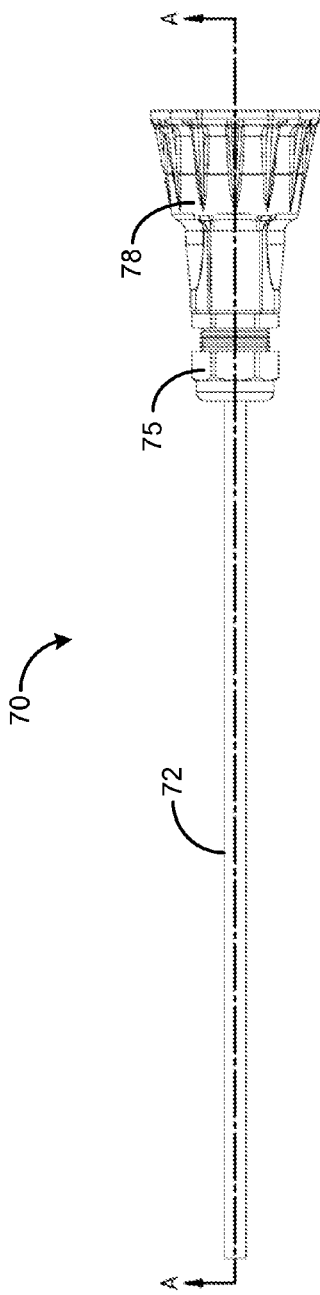
FIG. 8 is a top plan view of another exemplary embodiment of an interface extension.
Figure 9:
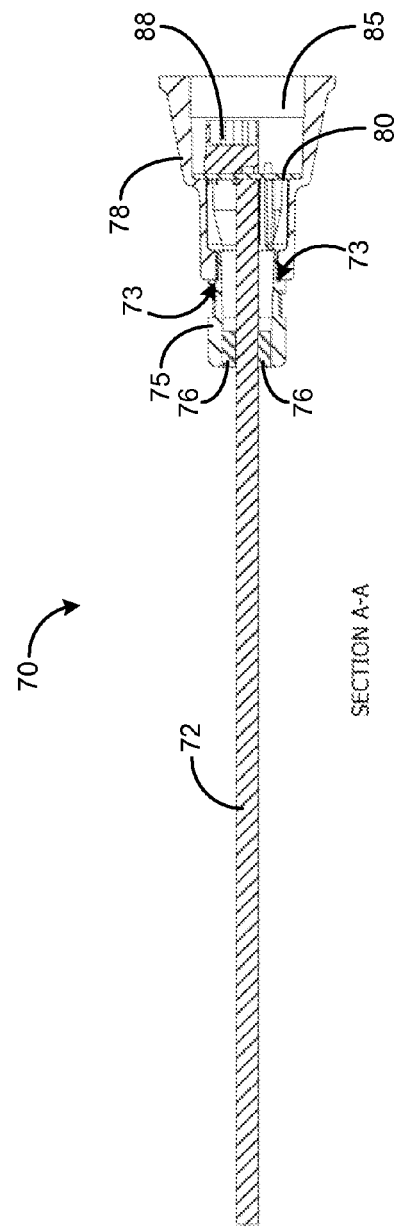
FIG. 9 is a cross-sectional view of the interface extension of FIG. 8.

FIGS. 8 and 9 depict another exemplary embodiment of an interface extension. As shown by FIG. 8, the interface extension 70 comprises a cable 72, a strain relief connector 75, and an enclosure 78. In one embodiment, the strain relief connector 75 is configured identically to the strain relief connector 45 such that the strain relief connector 75 is threaded and forms a water-tight seal around the cable 72 by pressing a grommet 76 (FIG. 9) between the connector 75 and the cable 72 when the connector 75 is rotated. In one embodiment, the grommet 76 comprises a formable rubber material. However, other techniques for forming a water-tight seal around the cable 72 are possible in other embodiments. Furthermore, the enclosure 78 engages the connector 75 such that an O-ring 73 (FIG. 9) forms a water-tight seal between the enclosure 78 and the connector 75. In one embodiment, the outer circumference of a portion of the connector 75 and the inner circumference of an end of the enclosure 78 are threaded such that the enclosure 78 may be rotated onto the connector 75 in order to form a water-tight seal.

FIG. 9 depicts a cross-sectional view of the interface extension 70 of FIG. 8. As shown by FIG. 9, in one embodiment, a printed circuit board ("PCB") 80 is mounted within a chamber 85 of the enclosure. The PCB 80 has a female interface connector 88 into which a technician may plug a cable (not shown) in order to enable communication with the NAD 20 (FIG. 2) via the cable 72. In one embodiment, the female interface connector 88 is a serial data connector, such as a female RS-232 connector, but other types of interface connectors are possible in other embodiments.

The PCB 80 may also be equipped with user interfaces, such as, for example, light sources (e.g. light emitting diodes (LEDs)) or switches, to enable various user inputs and outputs. For example, in one embodiment, various status information of the NAD 20 may be indicated by LEDs (not shown) mounted on the PCB 80.

As shown by FIG. 9, the cable 72 extends through the connector 75 and abuts the PCB 80. The interface connector 88 is mounted to the PCB 80 and is positioned within the chamber 85. When a cable (not shown) is plugged into the interface connector 88, data may be transmitted from a technician's equipment (not shown), through the interface connector 88, and to the NAD 20 via the cable 72. When access to the interface connector 88 is no longer needed, a removable cap (not shown) may be placed onto the enclosure 78 to create a water-tight seal around the chamber 85 in order to protect the PCB 80, the interface connector 88, and other components (not shown) which may be positioned within the chamber 85. As set forth above, the cable 72 may be any length such that the interface connector 88 may be positioned at any desired location within close proximity (e.g. several feet) of the NAD 20.

In one exemplary embodiment, assume that the NAD 20 is positioned within a manhole between the network facility 16 (FIG. 1) and one or more customer premises 30. Also assume that the manhole is prone to flooding such that the NAD 20 is often submerged under water. Furthermore, assume that the interface extension 40 comprises the cable 42, the strain relief connectors 44 and 45, the enclosure 48, the male interface connector 52 coupled to an end of the cable 42, and the cap 49.

Figure 10:
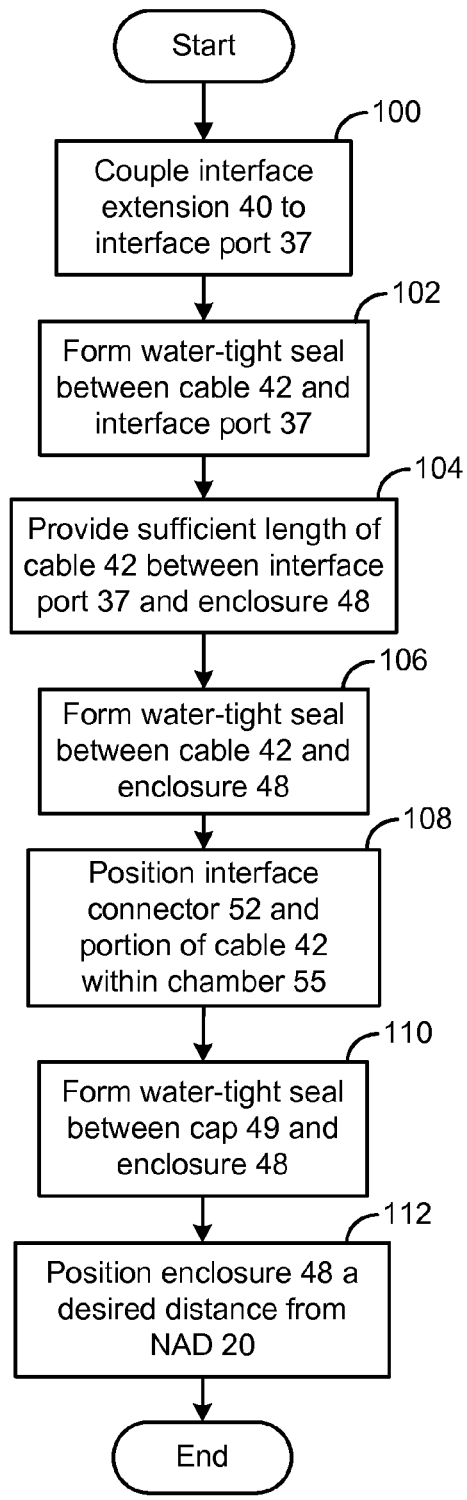
FIG. 10 is a flowchart illustrating an exemplary method of interfacing with an NAD.

The interface extension 40 is coupled to the interface port 37, as shown by block 100 of FIG. 10, by screwing the strain relief connector 44 onto the interface port 37 thereby forming a water-tight seal between the connector 44 and the port 37. Also, the strain relief connector 45 is tightened onto the cable 42 thereby forming a water-tight seal between the cable 42 and the connector 45, as shown by block 102. Furthermore, a sufficient length of the cable 42 is provided between the connectors 44 and 45 to allow the enclosure 48 to be positioned in a convenient location, as shown by block 104, such as, for example, near a cover of the manhole. The enclosure 48 is screwed onto the strain relief connector 45 thereby forming a water-tight seal between the enclosure 48 and the connector 45, as shown by block 106. Furthermore, the interface connector 52 and a portion of the cable 42 are positioned within the chamber 55, as shown by block 108. Then the removable cap 49 is screwed onto the enclosure 48 thereby forming a water-tight seal between the cap 49 and the enclosure 48 such that no water may enter the chamber 55, as shown by block 110. Finally, the enclosure 48 is positioned a desired distance from the NAD 20 to facilitate management access, as shown by block 112.

Figure 11:
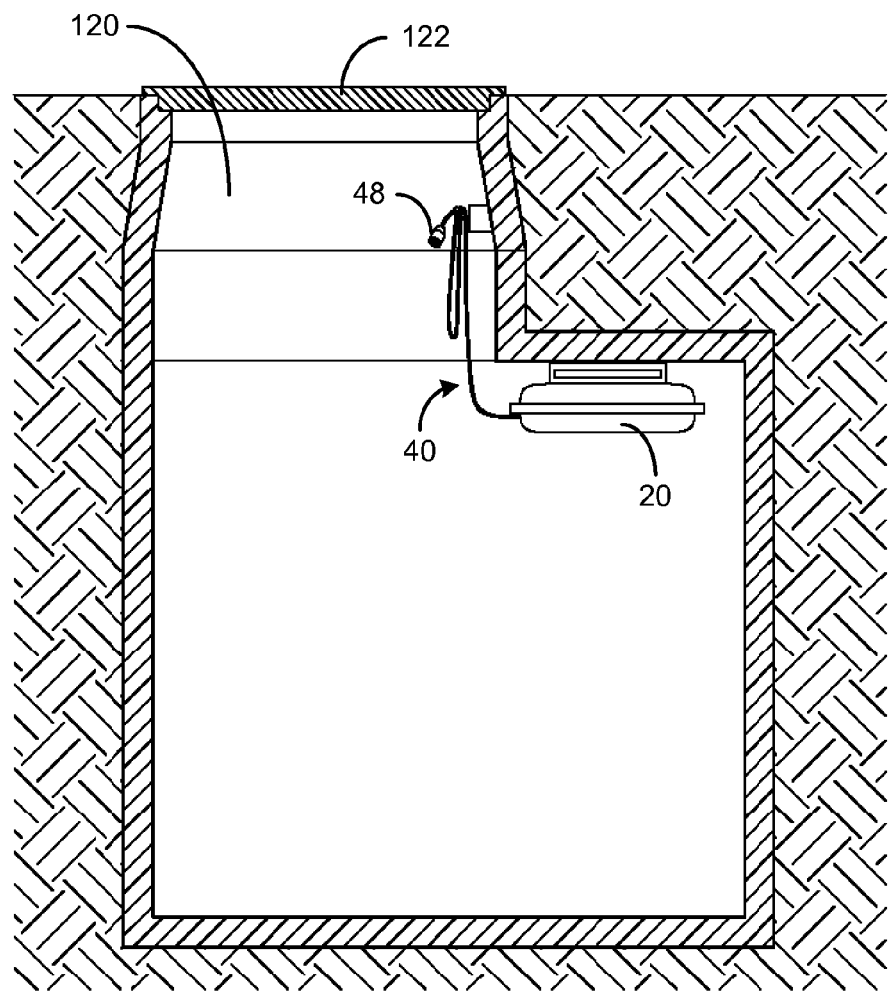
FIG. 11 depicts a network access device, such as is depicted by FIG. 2 positioned within a manhole.

FIG. 11 depicts the NAD 20 positioned within the manhole 120. As shown by FIG. 11, a cover 122 covers the entrance to the manhole 120. The NAD 20 is positioned a distance from the entrance to the manhole 120, and the interface extension 40 extends from the NAD 20 towards the entrance to the manhole such that the enclosure 48 is positioned near the cover 122 of the manhole 120.

Figure 12:
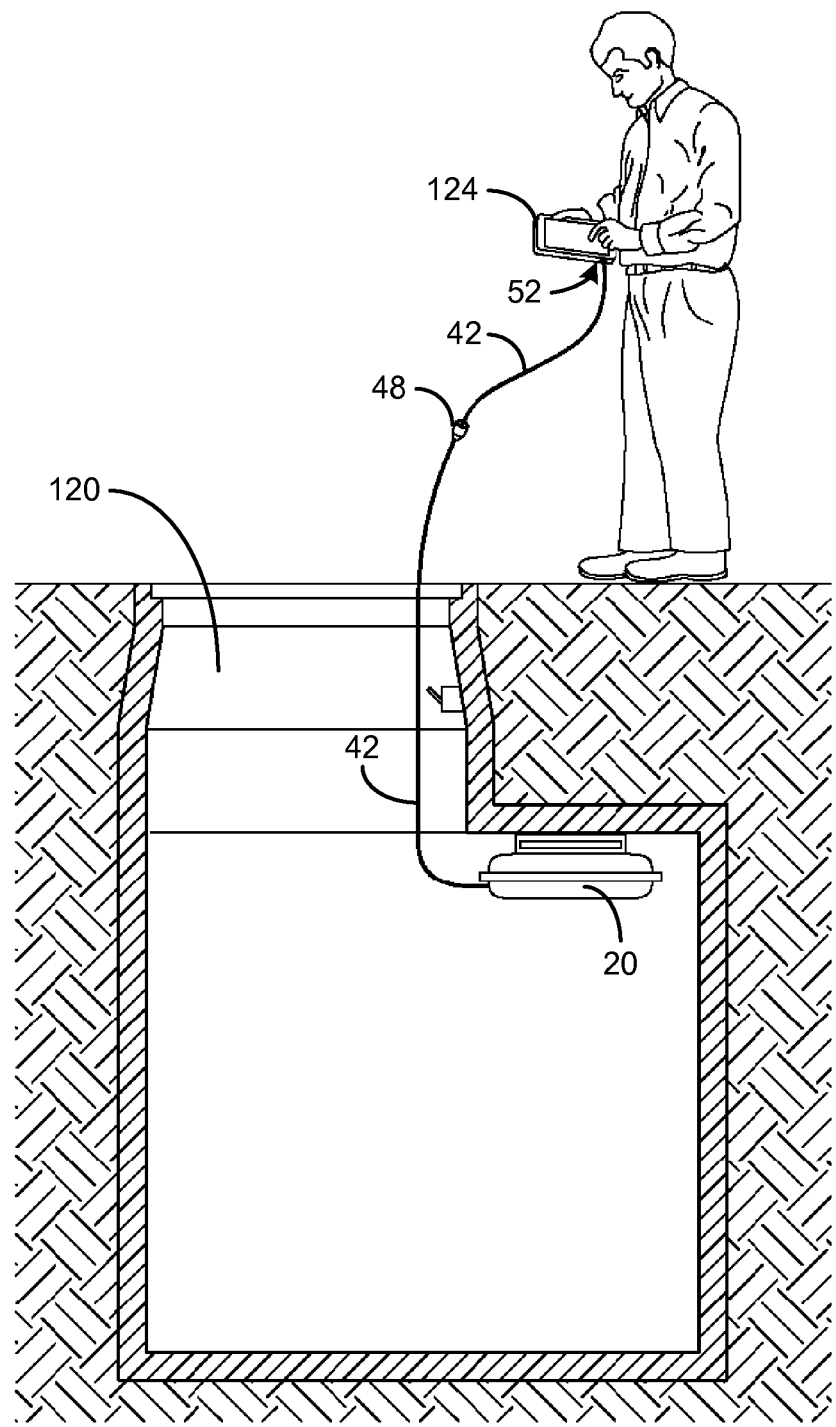
FIG. 12 depicts the network access device of FIG. 11 after a user has access an extension interface and connected a interface connector of the extension interface to a user interface device.

When management access is desired, a technician travels to the location of the NAD 20. The technician removes the cover 122 to the manhole 120 and locates the enclosure 48. The technician then removes the removable cap 49 to expose the interface connector 52 and extends the interface connector 52 from the chamber 55 and connects it to a user interface device 124, as shown by FIG. 12. The user interface device 124 then communicates with the NAD 20 via the interface connector 52 and the cable 42. As an example, the user may provision various settings, such as data rate or modulation format, for at least one subscriber coupled to the NAD 20. Once communication is complete, the technician then disconnects the interface connector 52 and coils the cable 42 and the interface connector 52 within the chamber 55. Finally, the technician replaces the cap 49 and repositions the enclosure 48 near the entrance of the manhole 120, and replaces the cover 122 to the manhole 120. Accordingly, management access to the NAD 20 is facilitated.

Now, therefore, the following is claimed:

1. A network access device, comprising:
a housing positioned between a network facility and at least one customer premises, the housing having an interface port, wherein the network access device is coupled to communication equipment at the network facility and communication equipment at the customer premises for communicating data signals between the communication equipment at the network facility and the communication equipment at the customer premises;
a cable extending from the interface port;
an enclosure having a chamber, the enclosure coupled to the cable at a distance from the housing, the enclosure having a first watertight seal about the cable and a second watertight seal about an access opening of the enclosure thereby preventing water from entering the chamber; and
an interface connector for detachably coupling to a user interface device, the interface connector positioned in the chamber.

2. The network access device of claim 1, wherein the interface connector is mounted on a printed circuit board.

3. The network access device of claim 1, further comprising a removable cap coupled to the enclosure and forming the second watertight seal, wherein removal of the cap from the enclosure exposes the interface connector.

4. The network access device of claim 3, wherein the interface connector and a portion of the cable are positioned within the chamber, and wherein the portion of the cable is extendable from the enclosure when the cap is removed.

5. The network access device of claim 1, wherein the interface connector has an electrical component for contacting an interface connector of the user interface device, and wherein the interface connector of the network access device is positioned within the chamber such that the electrical component is within the sealed chamber.

6. A method for interfacing with a network access device, comprising the steps of:
providing an interface extension having a cable, an enclosure, and an interface connector, the enclosure and the interface connector coupled to the cable, the enclosure having an access opening for providing access to the interface connector within the enclosure, the enclosure having a watertight seal between the cable and the interface port and a watertight seal between the cable and the enclosure;
communicating at the network access device data signals between communication equipment at a network facility and communication equipment at a customer premises;
forming a watertight seal for the access opening thereby preventing water from contacting the interface connector within the enclosure; and
positioning the enclosure a distance from the network access device.

7. The method of claim 6, further comprising the steps of:
coupling a user interface device to the interface connector; and
communicating between the user interface device and the network access device via the cable.

8. The method of claim 6, wherein the forming step comprises the step of engaging a removable cap with the enclosure thereby forming a watertight seal between the removable cap and the enclosure.

9. The method of claim 6, wherein the interface connector has an electrical component for contacting an interface connector of a user interface device, and wherein the electrical component is within the chamber.

10. The method of claim 8, further comprising the step of removing the removable cap from the enclosure, thereby exposing the interface connector within the enclosure.

11. The method of claim 6, wherein the network access device is positioned in a manhole or a handhole.

12. A network access device, comprising:
a housing positioned between a network facility and at least one customer premises, the housing having an interface port, wherein the network access device is configured to communicate data signals between communication equipment at the network facility and communication equipment at the customer premises;
a cable extending from the interface port;
an enclosure having a first opening sealed about the cable, the enclosure further having a second opening sealed by a removable cap, wherein the enclosure and the removable cap form a watertight chamber within the enclosure; and an interface connector for detachably coupling to a user interface device, the interface connector coupled to the cable and positioned in the watertight chamber.

13. The network access device of claim 12, wherein the removable cap has threads for coupling the cap to the enclosure.

\* \* \* \* \*